United States Patent Office 3,395,582
Patented Aug. 6, 1968

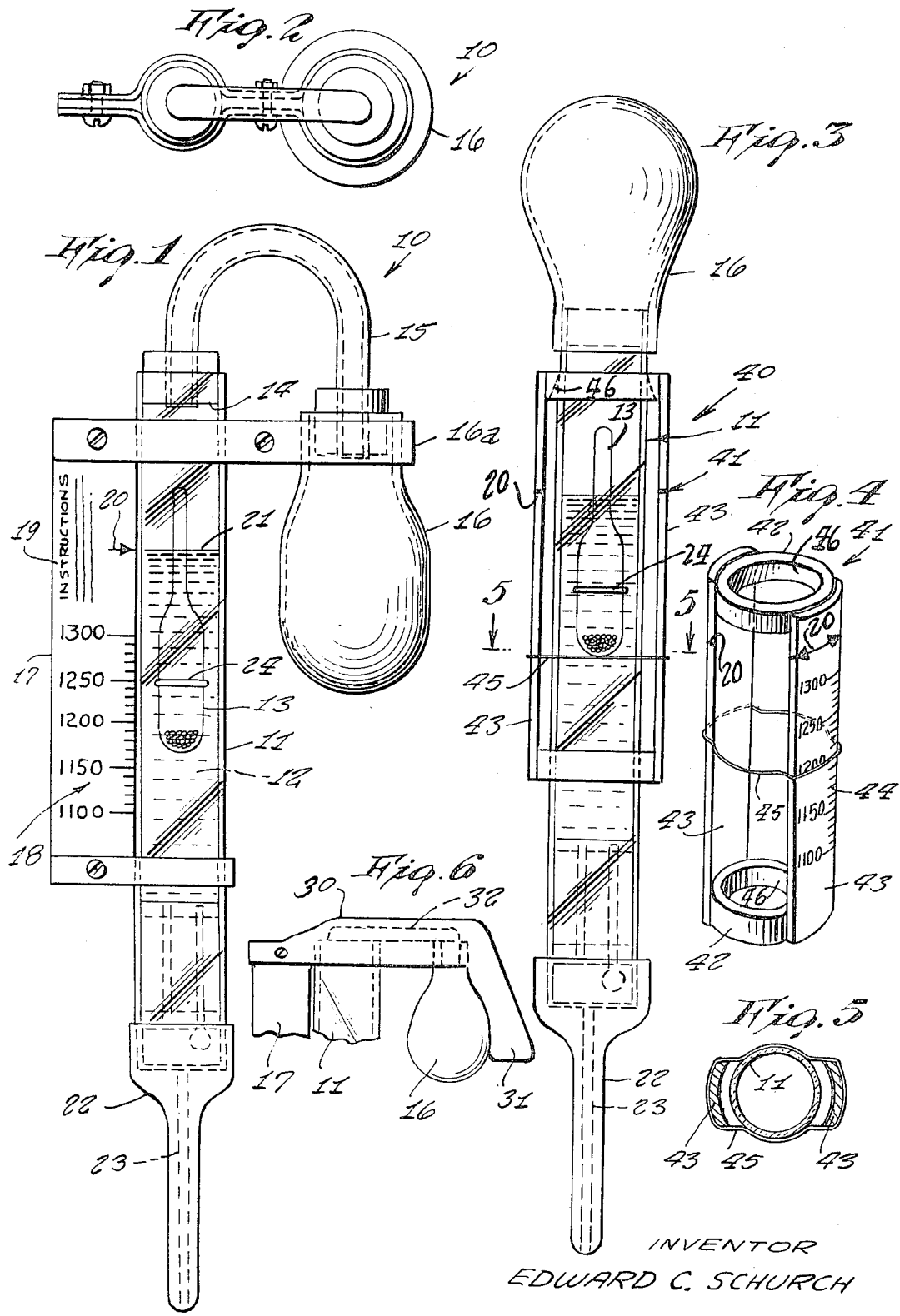

3,395,582
HYDROMETER
Edward C. Schurch, 885 S. Milwaukee St.,
Denver, Colo. 80209
Filed Nov. 14, 1966, Ser. No. 593,904
3 Claims. (Cl. 73—446)

This invention relates generally to hydrometer instruments used to determine specific gravity of various liquids.

A principal object of the present invention is to provide a hydrometer having self contained means so that it may be more convenient to use and easier to read. It is generally well known that in a conventional hydrometer, the graduations and figures are on the float and are small and difficult to read especially if the eye sight is poor. Because of the design necessity, the float stem containing the graduations and figures is necessarily small leaving little space for the scale. Also the scale must be read through the glass tube which frequently is foggy from condensation on its inside surface. To further exasperate the user, the float invariably turns around so that the scale is on the back side and must be jogged to bring it around into a readable position.

Accordingly, it is another object of the present invention to provide an improved hydrometer wherein the scale is located on the outside of the glass tube where it can be clearly seen without the above objectionable features.

Other objects are to provide an improved hydrometer which is simple in design, inexpensive to manufacture and efficient in operation.

These and other objects will be readily apparent upon a study of the following specification and the accompanying drawing wherein:

FIGURE 1 is a side elevation view of a preferred form of the invention,

FIGURE 2 is a top plan view thereof,

FIGURE 3 is a side view of a modified form of the invention,

FIGURE 4 is a perspective view of a sleeve associated with the structure shown in FIGURE 3, FIGURE 5 is a cross sectional view taken on line 5—5 of FIGURE 3, and FIGURE 6 is a fragmentary side elevation view of a modified bracket used in the construction shown in FIGURE 1.

Referring now to the drawing in detail, the reference numeral 10 represents an improved hydrometer according to the present invention wherein there is a glass tube 11 for containing a liquid 12 to be measured for specific gravity and within which there is a weighted float 13. The upper end of the tube receives a cap 14 from which a rubber or plastic tube 15 extends to a rubber bulb 16 supported on a bracket 16a, the bracket also supporting a flat panel 17 alongside the glass tube 11, the panel having a graduated scale 18 and operating instructions 19 imprinted thereupon. The scale 18 comprises specific gravity calibrations to be associated with the floatation position of the float 13 within the liquid. The panel 17 further includes an indicator arrow 20 imprinted thereupon for defining the surface level 21 of the liquid. The scale 18 is imprinted upon both sides of the panel for convenient use by both right or left hand users.

A fitting 22 at the lower end of glass tube 11 has an opening 23 therethrough to permit drawing liquid into and out of the tube.

In operative use, the fitting is placed into a liquid to be measured, the bulb squeezed and released until a quantity of the liquid enters the tube 11 to the level indicated by arrow 20. A ring 24 formed around the float is then aligned with the scale for a reading. Thus in the example illustrated in FIGURE 1, there is a reading of 1250, which can be clearly read without the objections of a conventionally read hydrometer.

In a modified construction shown in FIGURE 6, a bracket 30 made of molded rubber or plastic includes a pistol grip type handle 31 alongside the bulb for convenient grasp, and a molded opening 32 communicating between the glass tube and rubber bulb.

In a modified form of FIGURES 3, 4 and 5, a sleeve 41 is frictionally secured to tube 11, by rings 42. Spaced arcuate panels having scales thereon are secured to the rings 42. The inner surfaces 46 of rings 42 are leveled to provide a wedging effect to increase the frictioned grasp of the rings on the tube 11. A liquid level mark 20 is provided on the panels. An indicator ring 24 is used to read the specific gravity or a sliding hoop 45 can be aligned with the float 13. Of course when the hoop 45 is used the reading on the scale will have to be adjusted because of the distance between the ring 24 and hoop 45. Use of hoop 45 eliminates the necessity of adopting float 13 with a ring 24 whereby an existing hydrometer may be converted merely by securing sleeve 41 on the tube.

While various changes may be made in the detail construction it is understood that such changes will be within the spirit and scope of the present invention, as is defined by the appended claims.

Having thus set forth and disclosed the nature of this invention, what is claimed is:

1. In an improved hydrometer, the combination of a transparent glass tube, a fitting secured to the lower end of said glass tube, said fitting having an opening therethrough to admit and discharge liquid into and from said glass tube, a molded bracket at the upper end of said tube, a rubber bulb supported by said bracket, a passage molded within said bracket communicating between the upper end of said glass tube and said rubber bulb, a pistol type grip formed at one end of said bracket, said grip being adjacent said rubber bulb for convenient squeezing thereof, and means for measuring the specific gravity of liquids placed within said glass tube.

2. The combination as set forth in claim 1 wherein said means comprises a weighted float within said glass tube, said float having an integral circumferential ring clearly visible through said glass tube, said molded bracket further supporting a panel adjacent an outer side of said glass tube, a scale comprising specific gravity graduations and numerals imprinted upon both sides of said panel, and a reference arrow imprinted upon said panel to indicate the surface level of said liquid in said glass tube.

3. The combination as set forth in claim 1 wherein said means comprises a weighted float within said glass tube, and a slidable sleeve, frictionally secured around said glass tube, said sleeve comprising a pair of spaced apart rubber washers for frictionally engaging said glass tube, a pair of arcuate panels secured between said washers, specific gravity calibrated scales imprinted on said panels and a slidable wire ring frictionally supported around said sleeve.

References Cited

UNITED STATES PATENTS

| D. 110,959 | 8/1938 | Dunzweiler. | |
| 1,367,436 | 2/1921 | Stern | 73—441 |
| 1,677,801 | 7/1928 | Sode | 73—441 |
| 1,732,961 | 10/1929 | Badell | 73—441 |
| 2,410,031 | 10/1946 | Hoyer | 73—33 |

FOREIGN PATENTS 930,759   7/1963   Great Britain.

RICHARD C. QUEISSER, Primary Examiner.
JOHN K. LUNSFORD, Assistant Examiner.